United States Patent

Perroud et al.

[11] Patent Number: 5,164,864
[45] Date of Patent: Nov. 17, 1992

[54] CIRCUIT FOR COMPARING HIGH FREQUENCY AMPLITUDE MODULATED SIGNALS

[75] Inventors: Philippe Perroud, Meylan; Jean-Luc Jaffard, Saint Egreve, both of France

[73] Assignee: SGS-Thomson Microelectronics S.A., Gentilly, France

[21] Appl. No.: 567,523

[22] Filed: Aug. 15, 1990

[30] Foreign Application Priority Data

Aug. 16, 1989 [FR] France ................... 89 11227

[51] Int. Cl.$^5$ ............... G11B 15/14; H04N 5/78; H04N 9/79
[52] U.S. Cl. ................ 360/64; 360/10.3; 358/312
[58] Field of Search ............ 360/10.1, 10.3, 64, 360/65; 358/312, 335; 330/277; 307/351, 530

[56] References Cited

U.S. PATENT DOCUMENTS

| | | | |
|---|---|---|---|
| 4,426,666 | 1/1984 | Kobayashi et al. | 360/10.3 |
| 4,498,058 | 2/1985 | Benrud | 330/277 |
| 4,587,580 | 5/1986 | Takayama et al. | 360/65 |
| 4,600,952 | 7/1986 | Igata et al. | 360/64 |
| 4,672,469 | 6/1987 | Namiki et al. | 360/10.3 |
| 4,760,474 | 7/1988 | Takimoto | 360/64 |

FOREIGN PATENT DOCUMENTS 0049989 10/1981 European Pat. Off. .
0136816 10/1984 European Pat. Off. .

*Primary Examiner*—Aristotelis Psitos
*Assistant Examiner*—Won Tae C. Kim
*Attorney, Agent, or Firm*—Lowe, Price, Le Blanc & Becker

[57] ABSTRACT

A comparison circuit associated with a video tape recorder having two identical legs (41, 42), one of which (41) is connected to a head of a first type and the other (42) to a head of a second type, the outputs of both being connected to a respective input of a comparison means (56) for selecting in "search" mode the head which presents the highest signal amplitude. Each branch comprises, in series, a high-pass filter (45), a variable gain amplifier (46), a multiplier (47), a low-pass filter (48) and a capacitance amplifier (49).

12 Claims, 5 Drawing Sheets

CIRCUIT FOR COMPARING HIGH FREQUENCY AMPLITUDE MODULATED SIGNALS

BACKGROUND OF THE INVENTION

The present invention relates to circuits for comparing amplitude modulated signals and more particularly circuits for comparing signals from video tape recorder heads.

Some video tape recorders (VTR) comprise four heads, two for a "normal duration" mode referenced S1 and S2 which serve both for recording and reading, and two for a "long duration" mode referenced L1 and L2 which also serve both for recording and reading. Generally, the duration of a recording or reading operation in the latter mode is twice the "normal duration" mode.

The four heads are integral with a circular drum 1 schematically shown in the top view of FIG. 1. The two heads S1 and S2 are diametrical as well as heads L1 and L2. Moreover, heads L1 and L2 are shifted by an angle α generally low, of about one thousandth radian, with respect to heads S2 and S1, respectively.

The VTR heads record or read data (picture and sound) on a magnetic tape 2 shown on FIGS. 1 and 2. Data are contained in rectilinear tracks 3 which exhibit a small angle β with respect to the longitudinal axis of the tape. Tracks 3 are arranged side by side.

In operation, the drum rotates around its axis and the tape advances while being pressed against the drum over more than 180° (FIG. 1). The heads are actuated at a relative speed with respect to the tape. In the "normal duration" mode, each of heads S1 and S2, one after the other, interacts with a single track. In the "long duration" mode, each of heads L1 and L2 interacts with a single track one after the other.

On the tape portions not pressed against the drum, referenced B1 and B2 in FIG. 1, the longitudinal axis of the tape is perpendicular to the drum axis. On portion B3 of the tape pressed against the drum, the longitudinal axis of the tape at each point presents with the drum axis an angle slightly different from π/2 so that, for a relative head speed adapted with respect to the tape, the heads follow a path T1, shown in FIG. 2, parallel to the longitudinal axis of the tracks.

In addition, such four-heads VTRs can generally operate in an additional mode, called "search" mode, wherein pictures are presented at an accelerated speed for rapidly looking for specific sequences. In such a mode, the tape advance speed is increased and the path of the heads on the tape is no longer parallel to the longitudinal axis of the tracks. Such a path T2 of a "search" mode head is shown in dotted lines in FIG. 2. In this event, a head advances, on the one hand, inside tracks and, on the other hand, on areas separating tracks. The passage of the heads on the separation areas impairs the picture quality. Indeed, in "normal duration" mode or in "long duration" mode, the signal obtained from the tracks during reading is a high frequency signal (100 kHz to 10 MHz) with a constant amplitude. In "search" mode, the amplitude of the high frequency signal will decrease each time the head cuts a separation area between tracks. Thus, the resulting signal will be a high frequency amplitude modulated signal. The amplitude decreases at the areas separating tracks correspond to noise bars on pictures.

Then, it has been devised, in the prior art, for eliminating those noise bars, a method wherein one no longer uses, in "search" mode, only the S-type heads ("normal duration" mode) or only the L-type heads ("long duration" mode). Since the picture degradation corresponds to signal decreases, a circuit has been provided for comparing the amplitude of the signals associated with the head S with the amplitude of the signals associated with the head L of a couple of adjacent heads on the drum (couples (S1, L2) or (S2, L1)) and for selecting the head for which the amplitude is the highest. Moreover, in video tape recorders implementing such an approach, the signals from heads S and heads L are phase shifted by a value very close to π. This can be obtained by adjusting the advance speed of the tape. Performances are thus optimized, a decreasing signal being replaced by an increasing signal, and so on.

Such a circuit is shown in FIG. 3. It comprises two identical legs 21 and 22, leg 21 receiving at its input 23 signals from a "normal duration" head S and leg 22 receiving at its input 24 signals from a "long duration" head L.

An amplifier 25 is provided at the input of each leg. The output of this amplifier is connected to the input of a low-pass filter 26 used for eliminating noise peaks. A detector 27, usually formed by a diode D, a capacitor C1 and a resistor R, has its input connected to the output of the low-pass filter. This detector has a time constant $R \times C1$ and supplies a signal corresponding to the upper envelope of the high frequency modulated signal. The output of the detector constitutes the leg output.

The output of each leg is connected to an input of a same comparator 28. According to the sign of the voltage difference between its two inputs, the comparator supplies a logic "1" (generally the supply volt 5 V) or a logic "0" (generally 0 V), which determines the selection of the head associated with the maximal amplitude.

However, the circuit of FIG. 3 presents a limited sensitivity. The voltages of the input signals are liable to reach 600 mV under satisfactory conditions, and they may not exceed 60 mV in case of poor quality recording, for example. If it is desired to significantly amplify the low intensity signals, by choosing an amplifier gain equal to 15 for example, the signals at the amplifier output will reach 5 V in case of signals initially having a high intensity. This would cause the amplifier to operate in saturation mode. Thus, the gain must not be too high, and not exceed 7 or 8.

In addition, the detector must have a high time constant $R \times C1$ to ensure proper processing, usually about 1 ms. The resistance is about 10 kΩ and capacitance C1 is about 100 nF. Resistor R is integrable but capacitor C1 is too large to be integrated; it should be lower than about 10–20 pF. For decreasing C1 to such a value, the order of magnitude of R should be 100 MΩ, which is very high and would produce a very scattered integrated resistor. The circuit of FIG. 3 is therefore not completely integrable.

An object of the invention is to provide a circuit for comparing high frequency amplitude modulated signals with a high sensitivity.

Another object of the invention is to provide such a fully integrable comparison circuit.

SUMMARY OF THE INVENTION

To achieve those objects, the invention provides a circuit for comparing signals of a video tape recorder capable of operating in a first "normal duration" mode by using a first type of heads, in a second "long duration" mode by using a second type of heads and in a third "search" mode. This comparison circuit has two identical legs for processing signals; the input of one of the legs is connected to a head of the first type and the other to a head of the second type, and the output of each leg is connected to an input of a same comparator for selecting in "search" mode that of the two heads which has the highest amplitude. Each leg comprises, in series, a high-pass filter, a variable gain amplifier, a multi-plier multiplying a signal by itself, a low-pass filter and a capacitance amplifier comprising a second comparator supplying a current at the output, the first input of which constitutes the input of the capacitance amplifier and the second input is connected, on the one hand, to the ground through a capacitor and, on the other hand, to the output of the capacitance amplifier. The input of the high-pass filter constitutes the leg input and the output of the capacitance amplifier constitutes the output of the leg which is connected to the variable gain amplifier to control the gain thereof.

BRIEF DISCLOSURE OF THE DRAWINGS

The foregoing and other objects, features and advantages of the invention will be apparent from the following detailed description of a preferred embodiment as illustrated in the accompanying drawings wherein:

FIG. 1, already described, is a very schematic top view of a four-head video tape recorder drum;

FIG. 2, already described, shows a tape used in a video tape recorder;

FIG. 3, already described, shows a comparison circuit according to the prior art;

DESCRIPTION OF A PREFERRED EMBODIMENT

Figure 4:
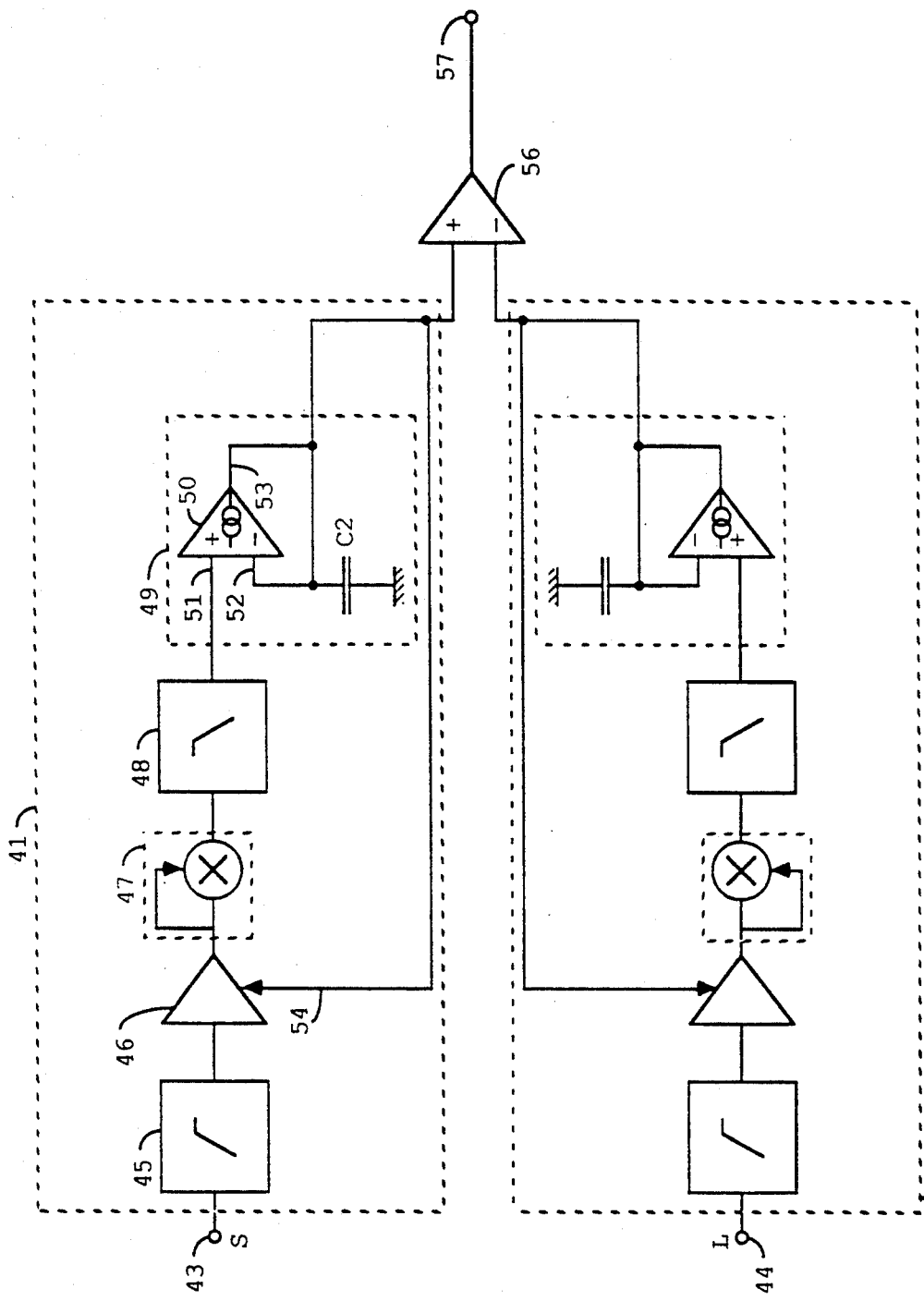
FIG. 4 shows a comparison circuit according to the invention.

FIG. 4 shows a circuit for comparing high frequency amplitude modulated signals according to the invention. It comprises two identical legs 41 and 42. Leg 41 receives at an input 43 signals from a head S ("normal duration" mode) and leg 42 receives signals from a head L ("long duration" mode) on an input 44.

The input of each leg is constituted by the input of a high-pass filter 45, the output of which is connected to the input of a variable gain amplifier 46. The output of amplifier 46 is connected to the input of a multiplier 47. A low-pass filter 48 has its input connected to the output of the multiplier and its output connected to the input of a capacitance amplifier 49. The latter conventionally comprises a comparator 50 supplying an output current, a first terminal 51 of which, or positive input, constitutes the input of the capacitance amplifier and the second input 52, or negative input, is connected, on the one hand, to the terminal of a capacitor C2, the other terminal of which is grounded, on the other hand, to the output 53 of comparator 50. Output 53 is feedback connected to a gain control input 54 of amplifier 46. In addition, the output of the capacitance amplifier constitutes the leg output.

The outputs of legs 41 and 42 are connected to the + and − inputs of a comparator 56, the output 57 of which forms the output of the comparison circuit.

Figure 5:
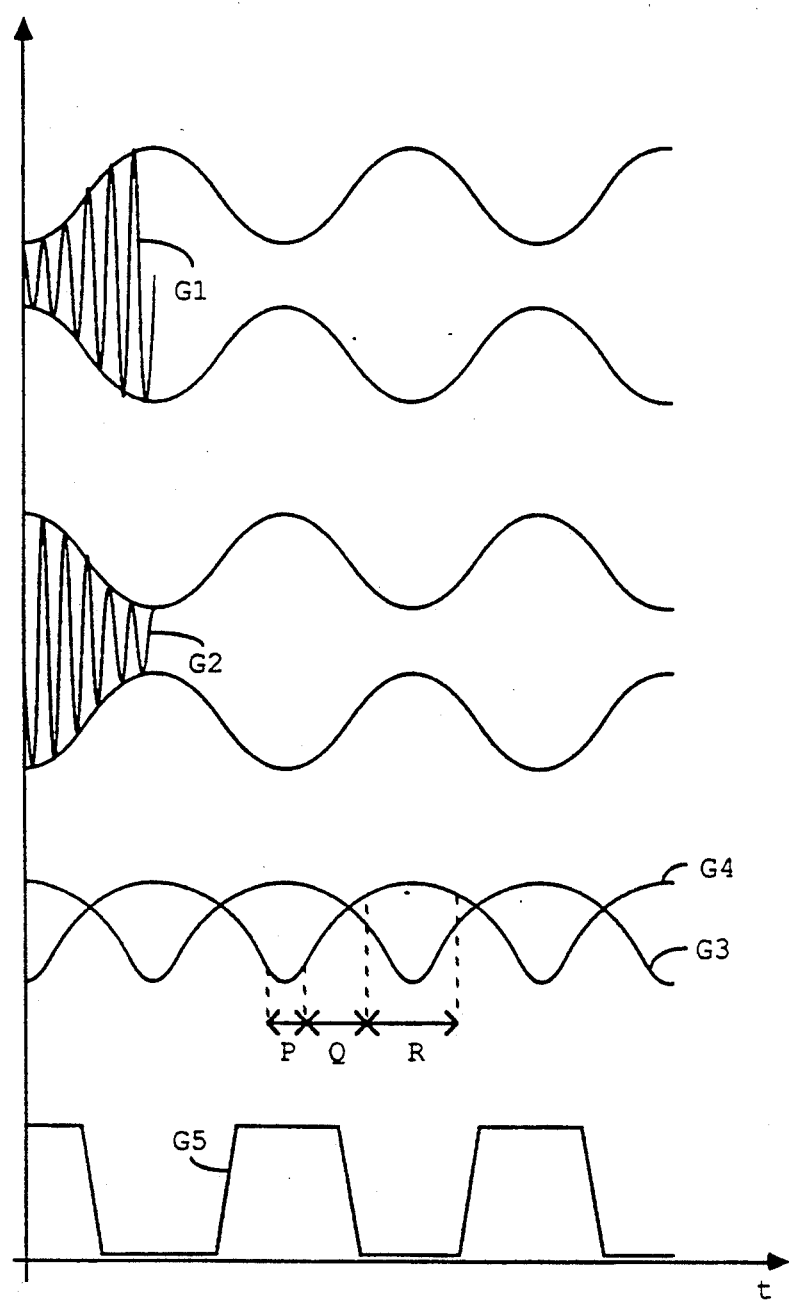
FIG. 5 shows signals at different steps of processing by the comparison circuit of FIG. 4.

The voltage signal from the head S received at the input terminal 43 of the circuit is represented as a function of time on curve G1 of FIG. 5. The signal from the head L applied to the input terminal 44 of the circuit is represented on curve G2 of FIG. 5. The input signals are high frequency amplitude modulated signals of sinusoidal type. Their phase shift is represented equal to $\pi$.

The high-pass filter 45 has for example a cutoff frequency of 1 MHz. The signal going out of the filter is amplified by the variable gain amplifier 46; the control of this gain is explained hereunder. Then, in multiplier 47, the signal is multiplied by itself. Since the incoming signal is sinusoidal, the signal supplied by the multiplier comprises a d.c. component and even harmonics of the input frequency. The low-pass filter 48, with a cutoff frequency of 100 kHz, transmits only this d.c. component.

Without the presence of the high-pass filter at the input of the leg, the double frequency harmonics would have a minimum frequency of 200 kHz since the signals from the heads vary from 100 kHz. By using the high-pass filter 45, this minimum frequency is 2 MHz. Filtering of the low-pass filter is thus more efficient by providing the high-pass filter.

The d.c. component at the output of the low-pass filter varies as a function of time since the signal from the heads is amplitude modulated. The frequency of this signal is about 10 KHz. The latter is introduced into the capacitance amplifier 49 which is a device conventionally used for smoothing an incoming signal. When the voltage difference between inputs 51 and 52 of comparator 50 is positive, the latter supplies at its output a current I. As, due to their design, comparators 50 and 56 have very low input currents with respect to their output currents, current I only serves to charge capacitor C2. The capacitor charge is realized according to the relation:

$$I = C2(\Delta V/\Delta T)$$

where $\Delta V$ is the voltage difference across the terminals of the capacitor and $\Delta T$ the charge duration. For a voltage difference $\Delta V$, one determines a time constant given by $$\tau = (C2/I)\Delta V.$$

A satisfactory smoothing can be obtained for a high time constant, of about 10 $\mu$s. With adapted values $\Delta V = 1V$ and $I = 1 \mu A$, capacitor C2 has a value $C2 = 10$ pF. Such a capacitor is integrable.

The smoothed signal present at the output of the capacitance amplifier is fed back to amplifier 46 in order to control the gain thereof. This amplifier has a gain which varies substantially linearly between a high value when the feedback control signal is low and a low value when the control signal is high.

Because of the gain control of amplifier 46, and, since signal amplitudes raised to the second power are considered, the signal at the output of a leg will have the shape illustrated on curves G3 (leg 41) and G4 (leg 42) of FIG. 5. Signals associated with curves G3 and G4 are introduced into comparator 56.

The gain of amplifier 46 may range from 1 to 20 for example. When amplitude (a) of the signal at the output of amplifier 46 is low, the gain is high (close to 20) but the component raised to the second order $a^2$ remains relatively low, as shown in a portion P of curve G4. On a portion Q, amplitude a is higher and the gain has decreased to a value which is liable to vary around 10.

Due to the fact the amplitude is squared, an increase in signal is obtained, as well as an increase in the variation speed of this signal. Thus, since the selection of either leg (crossing of curves) is mainly realized near such portions Q of the curves since the shift drift between the latter is about $\pi$, lowest intensity signals will be compared and sensitivity is increased. In addition, since the variation speed is higher, the selection is made with a better accuracy.

Lastly, when the amplitude a is close to its maximum, the gain is low; it is close to 1. Curves exhibit a flattened shape (portion R of curve G4). Signals from the heads with an amplitude of 0.6 V are compatible with the comparison circuit, this high value raised to the second power remaining lower than the admitted limit values.

Thus, the circuit according to the invention, in addition to its increased sensitivity, accepts high intensity signals. In addition, since capacitor C2 can be integrated, the circuit is completely integrable.

Comparator 56 shown in FIG. 4 supplies at its output a high level signal (5 V) if the intensity of the signal from leg 41 is higher than that of the signal from leg 42, and it supplies a low level signal (0 V) in the inverse case. This permits to determine the selection of the head associated with the maximum amplitude. The output signal of the comparator is represented by curve G5 in FIG. 5.

Figure 1:
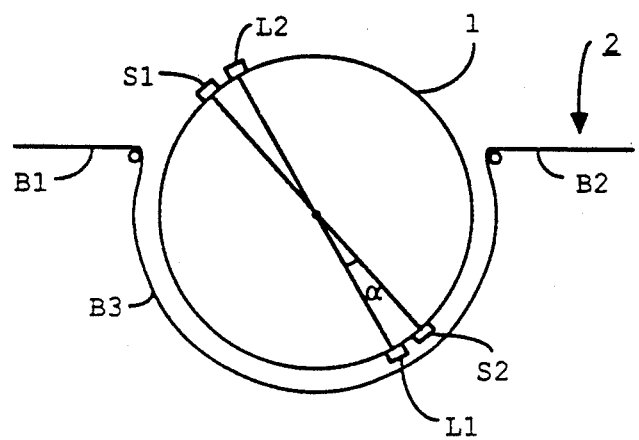
Figure 2:
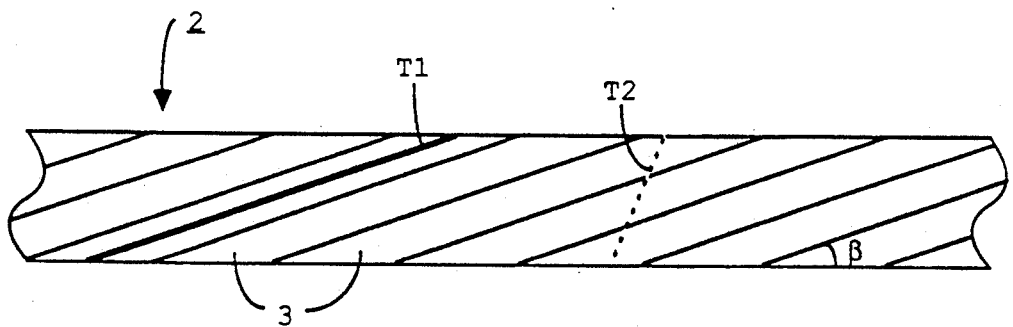
Figure 3:
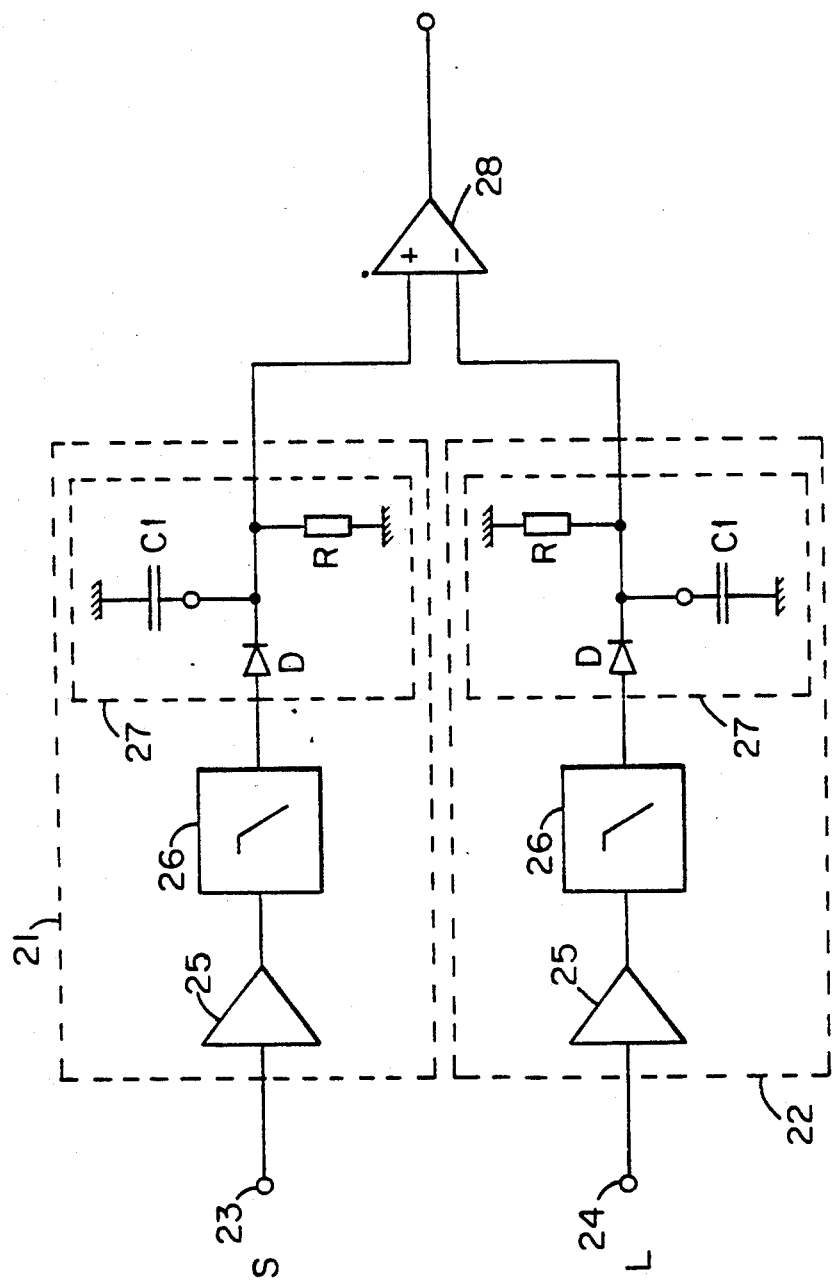

In the circuit of FIG. 3, the time constant of detector 27 is about 1 ms. It is not possible to replace this detector by a capacitance amplifier in order to form an integrated circuit since the capacitor would have a too high value (for a current of 1 μA, it would be necessary to have a capacitance of 100 nF).

The S-type heads have different features than those of L-type heads. The signal to noise ratio associated with heads S is higher than that associated with heads L. For low intensities liable to be detected by the circuit according to the invention because of its high sensitivity, it could be desirable to select head S rather than head L while the latter supplies signals having a higher amplitude.

Figure 6:
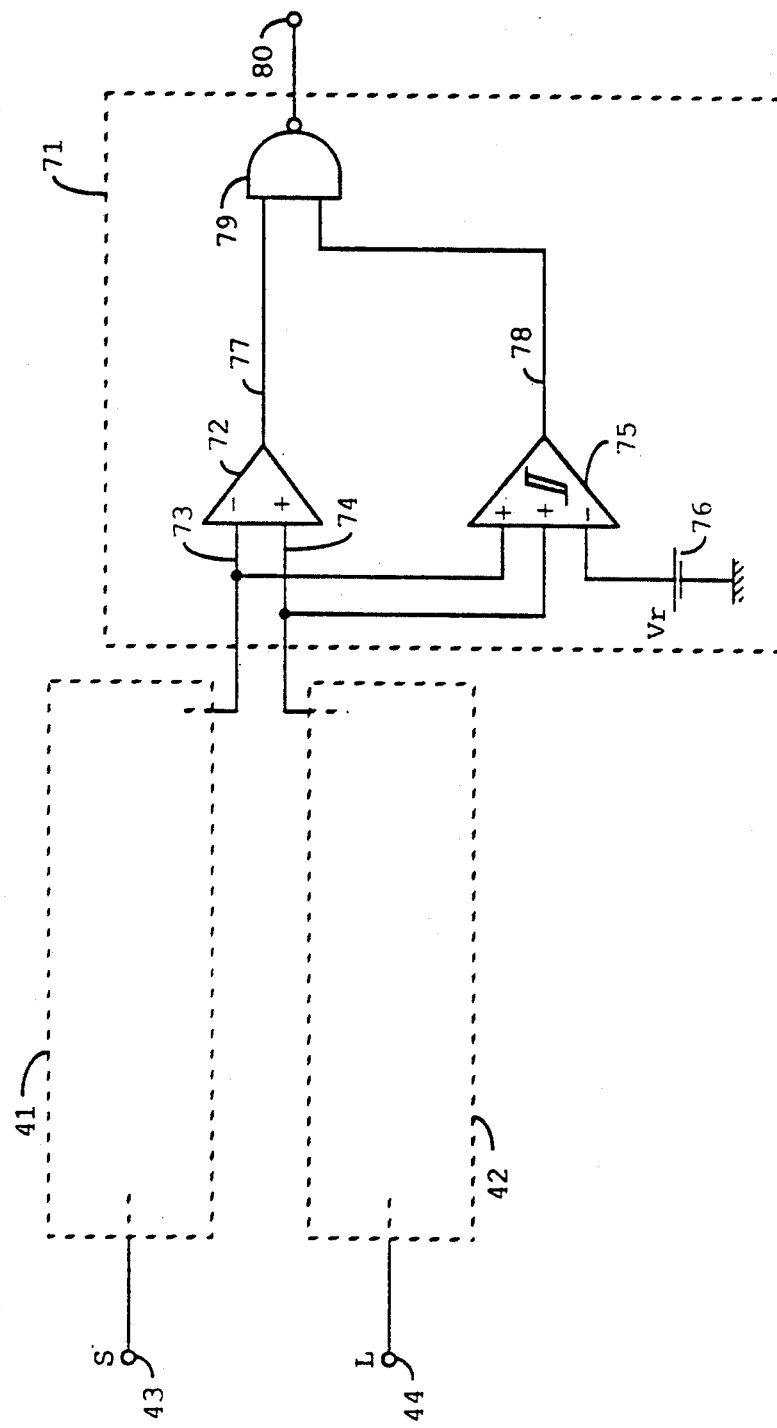
FIG. 6 shows a variant of the comparison circuit of FIG. 4.

This is achieved, according to a variant of the invention, by replacing comparator 56 of FIG. 4 by a device 71 shown in FIG. 6. Device 71 comprises a comparator 72 which receives on a first input 73, or negative input, the signal from leg 41 and on a second input 74, or positive input, the signal from leg 42. In device 71, the positive and negative inputs of comparator 72 are inverse with respect to those of comparator 56 of FIG. 4.

Each of inputs 73 and 74 is connected to a positive input of a conventional three-inputs hysteresis comparator 75, a negative input of which is connected to a voltage source 76 which supplies a reference voltage Vr. Each of outputs 77, 78 of comparators 72 and 75, respectively, is connected to an input of an NAND gate 79, the output 80 of which constitutes the output of device 71.

If the voltages on the two inputs 73 and 74 are higher than the reference voltage Vr, or if the voltage on one only of those two inputs is higher than Vr, the output of the hysteresis comparator is set to 1. Then, there is again on the output of device 71 a high signal when the signal associated to head S is higher than the signal associated with head L, and inversely. In that case, the circuit operation of FIG. 4 is found again.

On the contrary, if the voltages on the two inputs 73 and 74 are lower than the reference voltage, the output 78 of the hysteresis comparator is set to 0. Then, the output 80 of the NAND gate is set to 1. Thus, the head S is selected when the two signals at the output of legs 41 and 42 are lower than a reference voltage, even if the signal associated with head L is higher than the signal associated with head S.

We claim:

1. A comparison circuit associated with a video tape recorder able to operate in a first "normal duration" mode by using a first type of heads, in a second "long duration" mode by using a second type of heads and in a third "search" mode, this comparison circuit having two identical legs, an input of one leg being connected to a head of the first type and an input of the other leg to a head of the second type, outputs of both legs being connected to a respective input of a comparison means for selecting in "search" mode the head which receives a highest signal amplitude, wherein each leg comprises, in series, a high-pass filter, a variable gain amplifier, a multiplier multiplying a signal applied thereto by itself, a low-pass filter and a capacitance amplifier for smoothing an output signal of said low-pass filter comprising a first comparator supplying an output current of said capacitance amplifier, a first input of said first comparator constituting an input of the capacitance amplifier and a second input being connected to a ground through an integrated-circuit capacitor and to an output of said capacitance amplifier, an input of the high-pass filter constituting the leg input and the output of the capacitance amplifier constituting the leg output which is connected to said variable gain amplifier for gain control.

2. A comparison circuit according to claim 1, wherein the gain of said variable gain amplifier of each leg ranges from 1 to 20.

3. A comparison circuit according to claim 1 wherein said comparison means which comprises a second comparator having a negative input and a positive input each of which is connected to a positive input of a third three-input hysteresis comparator, the third input of which is connected to a source of a reference voltage, each of the outputs of the second and third comparators, respectively, being connected to an input of an NAND gate, the output of which constitutes the output of said comparison means, whereby the signal associated with the negative input of the second comparator is selected when the voltages on the two inputs of this second comparator are lower than said reference voltage.

4. A comparison circuit associated with a video tape recorder able to operate in a first "normal duration" mode by using a first type of heads, in a second "long duration" mode by using a second type of heads and in a third "search" mode, this comparison circuit having two identical legs, an input of one leg being connected to a head of the first type and an input of the other leg to a head of the second type, outputs of both legs being connected to a respective input of a comparison means for selecting in "search" mode the head which receives a highest signal amplitude, wherein each leg comprises, in series, a high-pass filter, a variable gain amplifier, a multiplier multiplying a signal applied thereto by itself, a low-pass filter and a capacitance amplifier comprising a first comparator supplying an output current of said capacitance amplifier, a first input of said first comparator constituting an input of the capacitance amplifier and a second input being connected to a ground through a capacitor and to an output of said capacitance amplifier, an input of the high-pass filter constituting the leg input and the output of the capacitance amplifier constituting the leg output which is connected to said variable gain amplifier for gain control, and wherein said comparison means comprises a second comparator having a negative input and a positive input each of which is connected to a positive input of a third three-input hysteresis comparator, a third input of which is connected to a source of a reference voltage, each of the outputs of the second and third comparators, respectively, being connected to an input of an NAND gate, an output of said NAND gate constitutes an output of said comparison means, whereby a signal associated with the negative input of the second comparator is selected when voltages on the two inputs of this second comparator are lower than said reference voltage.

5. A comparison circuit according to claim 4, wherein the gain of said variable gain amplifier of each leg ranges from 1 to 20.

6. An integrated-circuit apparatus for processing signals from video tape recorder heads of first and second types, respectively, said apparatus, comprising:
first and second circuit legs corresponding, respectively, to said recorder heads of first and second types, each including
(a) high-pass filtering means for high pass filtering signals from its respective head of first or second type,
(b) means responsive to the filtered signals for extracting a direct current component of the filtered signals,
(c) smoothing means for smoothing output signals of said extracting means, and
(d) means responsive to output signals of said smoothing means for controlling a gain of the leg; and
comparison means for receiving output signals from said two legs, and in response, supplying an output signal, said comparison means including:
a signal comparator for comparing the output signals of the legs;
a hysteresis comparator, having inputs connected to inputs of said signal comparator;
a source of a reference voltage connected to another input of said hysteresis comparator; and
means for logically combining output signals of said signal comparator and said hysteresis comparator.

7. An apparatus according to claim 6, wherein an input of said signal comparator is selected when the voltages on the inputs of said signal comparator are lower than said reference voltage.

8. An apparatus according to claim 6, wherein said extracting means comprises
means for squaring signals, and
low-pass filtering means for receiving an output of said squaring means.

9. An apparatus according to claim 6, wherein said smoothing means comprises a capacitance amplifier.

10. An apparatus according to claim 9, wherein said capacitance amplifier comprises an integrated-circuit capacitor.

11. An apparatus according to claim 6, wherein said gain controlling means includes a variable gain amplifier.

12. An apparatus according to claim 11, wherein the gain of said variable gain amplifier of each leg ranges from 1 to 20.

* * * * *